(12) United States Patent
Huynh et al.

(10) Patent No.: US 11,296,574 B1
(45) Date of Patent: Apr. 5, 2022

(54) MAINTAINING A DIELECTRIC IN AN AIRCRAFT ELECTRIC MACHINE

(71) Applicant: Calnetix Technologies, LLC, Cerritos, CA (US)

(72) Inventors: Co Huynh, Brea, CA (US); John Stout, Long Beach, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 35 days.

(21) Appl. No.: 17/060,542

(22) Filed: Oct. 1, 2020

(51) Int. Cl.
| | | |
|---|---|---|
| *H02K 5/10* | (2006.01) | |
| *B64D 27/24* | (2006.01) | |
| *B64D 27/02* | (2006.01) | |
| *B60L 50/40* | (2019.01) | |
| *B60L 50/60* | (2019.01) | |
| *H02K 7/18* | (2006.01) | |
| *H02K 11/00* | (2016.01) | |
| *H02K 11/30* | (2016.01) | |
| *H02K 21/22* | (2006.01) | |
| *H02K 7/116* | (2006.01) | |

(52) U.S. Cl.
CPC ............... *H02K 5/10* (2013.01); *B60L 50/40* (2019.02); *B60L 50/60* (2019.02); *B64D 27/02* (2013.01); *B64D 27/24* (2013.01); *H02K 7/116* (2013.01); *H02K 7/1807* (2013.01); *H02K 11/0094* (2013.01); *H02K 11/30* (2016.01); *H02K 21/22* (2013.01); *B60L 2200/10* (2013.01); *B64D 2027/026* (2013.01); *H02K 2205/09* (2013.01)

(58) Field of Classification Search
CPC ........ H02K 5/10; H02K 7/116; H02K 7/1807; H02K 11/0094; H02K 11/30; H02K 21/22; H02K 2205/09; B60L 50/40; B60L 50/60; B60L 2200/10; B64D 27/02; B64D 27/24; B64D 2027/026
See application file for complete search history.

(56) References Cited

U.S. PATENT DOCUMENTS

| | | | | |
|---|---|---|---|---|
| 2,611,797 A | * | 9/1952 | Beckwith | H02K 1/185 310/51 |
| 2,683,830 A | * | 7/1954 | Staak | H02K 1/148 310/216.091 |
| 3,789,249 A | * | 1/1974 | Purman | H02K 9/20 310/54 |
| 4,250,423 A | * | 2/1981 | Linscott, Jr. | H02K 1/185 310/216.124 |
| 4,262,224 A | * | 4/1981 | Kofink | H02K 5/1735 310/416 |
| 4,282,840 A | * | 8/1981 | Yamada | F02P 5/106 123/406.68 |
| 4,378,772 A | * | 4/1983 | Meyer | F02D 35/00 123/438 |
| 4,764,699 A | * | 8/1988 | Nold | H02K 1/185 310/165 |
| 4,825,531 A | * | 5/1989 | Nold | H02K 1/185 29/447 |
| 5,941,532 A | * | 8/1999 | Flaherty | F16J 15/363 277/400 |

(Continued)

*Primary Examiner* — Pedro J Cuevas
(74) *Attorney, Agent, or Firm* — Fish & Richardson P.C.

(57) ABSTRACT

An aircraft electric machine includes an electric stator that surrounds and supports a rotor. A housing defines a sealed chamber enclosing the electric stator and is configured to maintain an absolute pressure of a gas within the chamber as an aircraft with the aircraft electric machine changes altitude.

28 Claims, 9 Drawing Sheets

(56) References Cited

U.S. PATENT DOCUMENTS

| | | | |
|---|---|---|---|
| 6,257,589 B1* | 7/2001 | Flaherty | F16J 15/3412 |
| | | | 277/400 |
| 6,897,587 B1 | 5/2005 | McMullen et al. | |
| 7,476,992 B2* | 1/2009 | Rutsyamuka | H02K 5/10 |
| | | | 310/53 |
| 8,162,322 B2* | 4/2012 | Flaherty | F16J 15/3412 |
| | | | 277/400 |
| 9,954,414 B2 | 4/2018 | Cunningham et al. | |
| 10,612,351 B2 | 4/2020 | McMullen et al. | |
| 10,697,276 B2 | 6/2020 | McMullen | |
| 2005/0285458 A1* | 12/2005 | Moeleker | H02K 9/10 |
| | | | 310/57 |
| 2006/0261686 A1* | 11/2006 | Rutsyamuka | H02K 5/10 |
| | | | 310/53 |
| 2008/0100001 A1* | 5/2008 | Flaherty | F16J 15/3412 |
| | | | 277/400 |
| 2013/0152544 A1* | 6/2013 | Mart nez Casan | F04C 23/02 |
| | | | 60/226.1 |
| 2020/0185997 A1* | 6/2020 | Hirasawa | H02K 15/0062 |
| 2021/0328488 A1* | 10/2021 | Takahashi | H02K 5/1735 |
| 2021/0367465 A1* | 11/2021 | Takahashi | H02K 11/22 |
| 2021/0384784 A1* | 12/2021 | Takahashi | H02K 21/22 |
| 2021/0384789 A1* | 12/2021 | Mawatari | H02K 1/18 |
| 2021/0384794 A1* | 12/2021 | Tamura | H02K 3/04 |
| 2021/0384802 A1* | 12/2021 | Tamura | H02K 21/14 |
| 2021/0384808 A1* | 12/2021 | Tamura | H02K 21/14 |

* cited by examiner

US 11,296,574 B1

MAINTAINING A DIELECTRIC IN AN AIRCRAFT ELECTRIC MACHINE

TECHNICAL FIELD

This disclosure relates to electrical machines for aircraft applications.

BACKGROUND

Aircraft electrification is dependent on the performance and reliability of the electrical machines and their materials that constitute the aircraft. For example, electric motors (i.e., components that convert electrical energy into mechanical energy) and generators (i.e., components that convert mechanical energy into electrical energy) for aircraft applications are operated at varying altitudes and can be subjected to different ambient pressures. In an electric motor, the moving part is a rotor, which turns a shaft to deliver the mechanical power. The rotor interacts with a magnetic field of a stator to generate the forces that turn the shaft. The stator is the stationary part of the electric motor's electromagnetic circuit, and it is composed of windings and a laminated steel core.

SUMMARY

This disclosure describes maintaining and/or adjusting a pressure within a stator cavity or chamber of an aircraft electric machine to adjust a dielectric strength for the stator's windings at varying operating altitudes.

An example implementation of the subject matter described within this disclosure is an aircraft electric machine with the following features. An electric stator surrounds and supports a rotor. A housing defines a sealed chamber enclosing the electric stator and is configured to maintain an absolute pressure of a gas within the chamber as an aircraft with the aircraft electric machine changes altitude.

Aspects of the example aircraft electric machine, which can be combined with the example aircraft electric machine alone or with other aspects, include the following. The housing includes a bore seal between the stator and the rotor. The bore seal includes a non-metallic material. The bore seal defines a portion of the sealed chamber.

Aspects of the example aircraft electric machine, which can be combined with the example aircraft electric machine alone or with other aspects, include the following. The housing includes a pressure port configured to exchange pressure between an interior of and exterior of the chamber. A valve is fluidically coupled to the pressure port. The valve is configured to regulate pressure exchange through the pressure port.

Aspects of the example aircraft electric machine, which can be combined with the example aircraft electric machine alone or with other aspects, include the following. A pump or compressor is coupled to the pressure port.

Aspects of the example aircraft electric machine, which can be combined with the example aircraft electric machine alone or with other aspects, include the following. A controller is configured to control the pump or compressor responsive to a pressure within the chamber.

Aspects of the example aircraft electric machine, which can be combined with the example aircraft electric machine alone or with other aspects, include the following. The rotor includes a permanent magnet rotor.

Aspects of the example aircraft electric machine, which can be combined with the example aircraft electric machine alone or with other aspects, include the following. The aircraft electric machine is coupled to a propeller or fan such that the aircraft electric machine drives the propeller or fan.

Aspects of the example aircraft electric machine, which can be combined with the example aircraft electric machine alone or with other aspects, include the following. The aircraft electric machine is coupled to an internal combustion engine such that the aircraft electric machine is driven by the internal combustion engine.

An example implementation of the subject matter described within this disclosure is a method with the following features. A pressure is maintained at a first altitude within a sealed chamber that encloses an electric stator and is defined by a housing of an aircraft electric machine. The pressure within the sealed chamber is maintained at a second altitude. The second altitude is different from the first altitude.

Aspects of the example method, which can be combined with the example method alone or with other aspects, include the following. The electric machine is driven by an internal combustion engine.

Aspects of the example method, which can be combined with the example method alone or with other aspects, include the following. A propeller or fan is driven by the electric machine.

Aspects of the example method, which can be combined with the example method alone or with other aspects, include the following. The pressure is received by the chamber through a port in the housing. The port is sealed by a valve fluidically connected to the port.

Aspects of the example method, which can be combined with the example method alone or with other aspects, include the following. Maintaining the pressure within the chamber at the first altitude and the second altitude includes maintaining the pressure within the chamber to be greater than a pressure outside the housing when the electric machine is at altitude.

Aspects of the example method, which can be combined with the example method alone or with other aspects, include the following. The pressure within the chamber is substantially one atmosphere absolute pressure or greater.

Aspects of the example method, which can be combined with the example method alone or with other aspects, include the following. The pressure within the chamber is substantially a vacuum.

Aspects of the example method, which can be combined with the example method alone or with other aspects, include the following. A breakdown voltage is maintained above a desired threshold by the maintained pressure within the chamber.

Aspects of the example method, which can be combined with the example method alone or with other aspects, include the following. A pressure stream is received from a pressure sensor within the chamber. Responsive to the pressure stream, the pressure within the chamber is adjusted to achieve a desired dielectric property.

An example implementation of the subject matter within this disclosure is an aircraft propulsion system with the following features. An electric generator includes an electric stator surrounding and supporting a rotor. A housing defines a sealed chamber enclosing the electric stator. The housing includes a bore seal between the stator and the rotor. The bore seal includes a non-metallic material. The bore seal defines a portion of the sealed chamber. The housing is configured to maintain an absolute pressure of a gas within the chamber as an aircraft with the electric generator changes altitude.

Aspects of the example aircraft propulsion system, which can be combined with the example aircraft propulsion system alone or with other aspects, include the following. An internal combustion engine is coupled to and configured to drive the electric generator.

Aspects of the example aircraft propulsion system, which can be combined with the example aircraft propulsion system alone or with other aspects, include the following. The rotor is a first rotor, the electric stator is a first electric stator, the housing is a first housing, and the sealed chamber is a first sealed chamber. The aircraft propulsion system further includes the following features. An electric motor includes a second rotor and a second electric stator surrounding and supporting the second rotor. A second housing defines a second sealed chamber enclosing the second electric stator and is configured to maintain an absolute pressure of a gas within the second sealed chamber as an aircraft with the electric motor changes altitude. A propeller or fan is rotably coupled to the electric motor, the propeller or fan is configured to be driven by the electric motor.

Aspects of the example aircraft propulsion system, which can be combined with the example aircraft propulsion system alone or with other aspects, include the following. The first rotor or the second rotor includes a permanent magnet rotor.

Aspects of the example aircraft propulsion system, which can be combined with the example aircraft propulsion system alone or with other aspects, include the following. A pressure within the first sealed chamber or the second sealed chamber is substantially one atmosphere or greater.

Aspects of the example aircraft propulsion system, which can be combined with the example aircraft propulsion system alone or with other aspects, include the following. A pressure within the first sealed chamber or the second sealed chamber is substantially a vacuum.

Aspects of the example aircraft propulsion system, which can be combined with the example aircraft propulsion system alone or with other aspects, include the following. A controller is coupled to the electric motor and the electric generator. The controller is configured to exchange electrical current between the electric generator and the electric motor.

Aspects of the example aircraft propulsion system, which can be combined with the example aircraft propulsion system alone or with other aspects, include the following. The controller is further configured to receive a pressure stream or a dielectric stream from a sensor within the first sealed chamber or the second sealed chamber. The controller is further configured to, responsive to the pressure stream or the dielectric stream, send a control signal to a compressor to adjust the pressure within the first sealed chamber or the second sealed chamber to achieve a desired dielectric value.

Aspects of the example aircraft propulsion system, which can be combined with the example aircraft propulsion system alone or with other aspects, include the following. A battery or super capacitor is electrically coupled to the electric generator and the electric motor. The battery or super capacitor is configured to store charge from the electric generator and supply charge to the electric motor.

Aspects of the example aircraft propulsion system, which can be combined with the example aircraft propulsion system alone or with other aspects, include the following. A gearbox is coupled to the electric motor and the propeller or fan. The gearbox is configured to be driven by the electric motor and drives the propeller or fan.

Aspects of the example aircraft propulsion system, which can be combined with the example aircraft propulsion system alone or with other aspects, include the following. The electric motor or the electric generator include a pressure port.

The aircraft electric machine described here with an integrated non-metallic bore seal and metal housing provides improved dielectric strength of the stator's winding region at variable atmospheric pressure and reduces frequency of failures as a result of voltage breakdowns. The integrated non-metallic bore seal and metal housing containing the stator allows adjustment of the desired pressure in the stator's winding cavity at different operating altitudes. In some implementations, the pressure within the stator's winding cavity is pressurized at substantially 1 atmosphere or higher and delivers effective stator winding's dielectric performance at high altitudes. In some implementations, the pressure within the stator's winding cavity is kept at substantially a vacuum.

The details of one or more implementations are set forth in the accompanying drawings and description. Other features, objects, and advantages of these systems and methods will be apparent from the description and drawings, and from the claims.

DESCRIPTION OF DRAWINGS

FIG. 4A is displayed with a standard scale while FIG. 4B is displayed with a logarithmic scale. FIG. 4C illustrates a pressure range approaching vacuum.

Like reference symbols in the various drawings indicate like elements.

DETAILED DESCRIPTION

This disclosure relates to controlling, adjusting, and/or maintaining a pressure within an aircraft electric machine in order to control, adjust, and/or maintain a dielectric strength of stator windings within an aircraft electric machine. The aircraft electric machine described herein can be an electric motor or an electric generator and can be used to power electric vehicles such as electric aircraft propulsion systems, urban air mobility (UAM), and unmanned aerial vehicles (UAVs), or to provide electrical power in the case of an electric generator. The aircraft electric machine includes a rotor, a stator, and a metal housing with an integrated non-metallic bore seal. The rotor is the moving part while the stator is the stationary part of the electric machine that, in some implementations, surrounds and supports the rotor. The electrical stator includes windings contained in a laminated magnetic steel core. The electric machines operate through the interaction between the stator's magnetic field generated by electrical current flowing through the windings and the rotor's magnetic field to generate a force in a form of a torque applied on the machine's rotor and shaft to turn the shaft and to deliver the mechanical power. A housing, including an integrated bore seal (e.g., a sealed chamber), encloses the electrical stator and includes non-metallic materials, such as air or similar gasses. In the context of this disclosure, a "sealed chamber" is meant as a chamber that maintains a pressure within a defined leakage rate. That is, minor leaks within the chamber are acceptable so long as the pressure within the sealed chamber is maintained within a desired range for the duration of a flight.

The aircraft electric machine described herein with an enclosed stator winding cavity defined by a housing and an integrated non-metallic bore seal provides improved dielectric strength of the stator winding at variable atmospheric pressure and prevents failures as a result of voltage breakdowns. The integrated bore seal and housing maintain a desired pressure around stator windings at various operating altitudes. In some implementations, the pressure around the stator windings is maintained at substantially one atmosphere or higher (plus or minus 20%) and delivers effective dielectric performance between the stator windings and the surrounding electrically conductive housing, and/or other structures at high altitudes. In some implementations, the pressure around the stator windings is maintained at substantially a vacuum and delivers effective dielectric performance between the stator windings and the surrounding electrically conductive housing, and/or other structures at high altitudes.

Figure 1A:
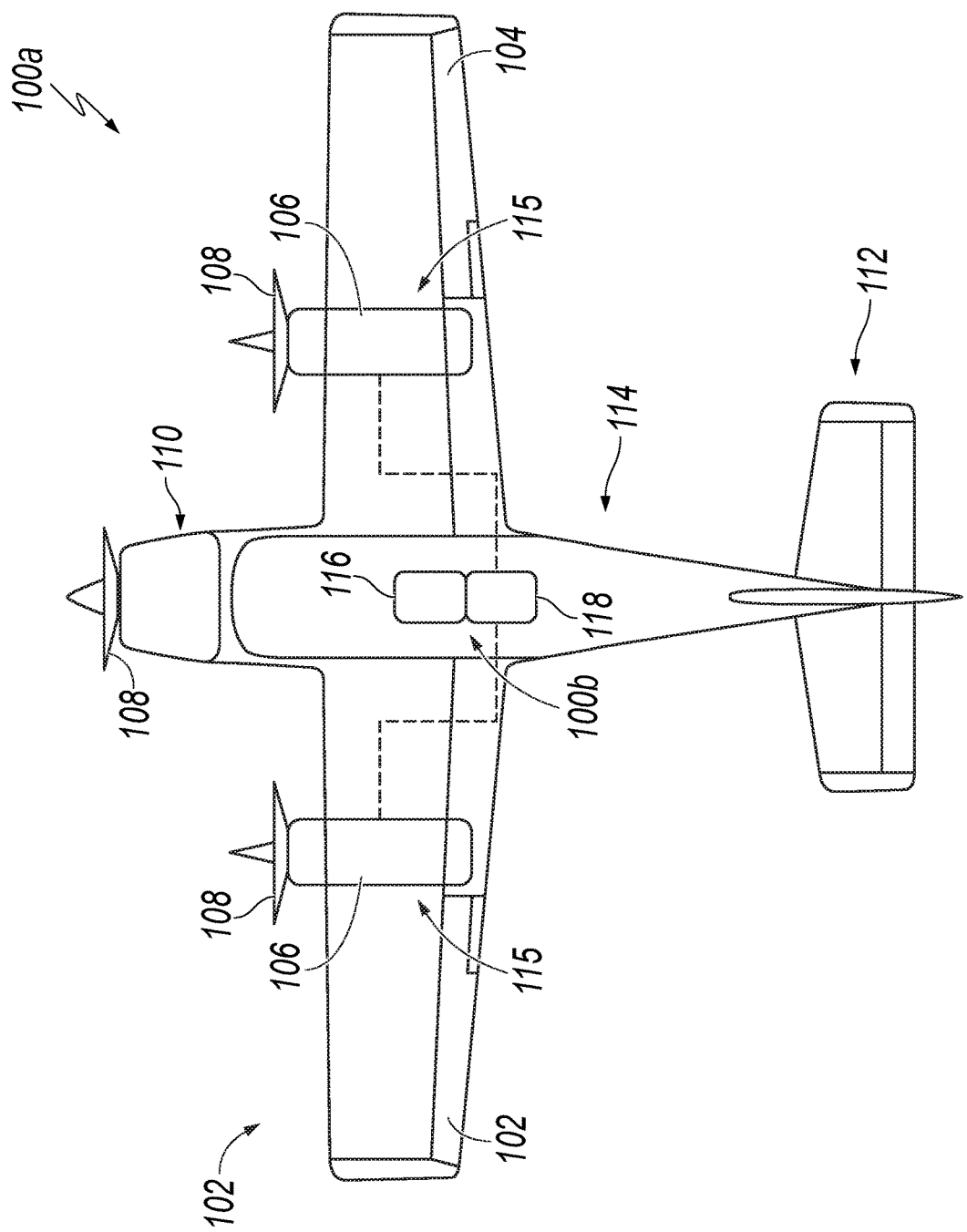
FIG. 1A is a top-down schematic diagram of an example aircraft.

FIG. 1A is a top-down schematic diagram of an example aircraft 100a. An aircraft 100a includes a fuselage 110 which is the area at the front of the aircraft 100a, an empennage 112 (tail assembly). A left wing 102 and a right wing 104 are attached on either side of the fuselage 110, and a main body frame 114 extends between the fuselage 110 and the empennage 112. A propulsion system 115 includes an electric motor 106 and a propeller 108. While illustrated as having a propeller 108, the propulsion system 115 can include a variety of air movers, for example, a ducted fan or a non-ducted fan, without departing from this disclosure. An electric motor 106 is attached to the left-wing 102 of the aircraft 100a and it helps propel the aircraft 100a. The electric motor 106 is connected to the propeller 108 such that the electric motor 106 drives the propeller 108. Many different types of electric motors can be used without departing from this disclosure. For example, permanent magnet synchronous motors, field wound synchronous motors, or inductive asynchronous motors can be used without departing from this disclosure. A similar motor and propeller arrangement is present on the opposite wing. In some implementations, an additional propulsion system 115 can be included in the fuselage 110. Please note, only a propeller 108 is visible in the present figure and the subsequent motor is not shown. While illustrated as having a single propulsion system 115 on each wing, greater or fewer power plants can be used. For example, two to eight propulsion systems 115 can be present on each wing, or zero power plants can be present on each wing. In the latter implementation, a propulsion system 115 can still be included within the fuselage to provide propulsion. While illustrated as including a propulsion system 115 within the fuselage, such an arrangement is optional. In other words, an aircraft can include any number of propulsion systems 115 greater than zero, providing balanced propulsion, without departing from this disclosure.

Figure 1B:
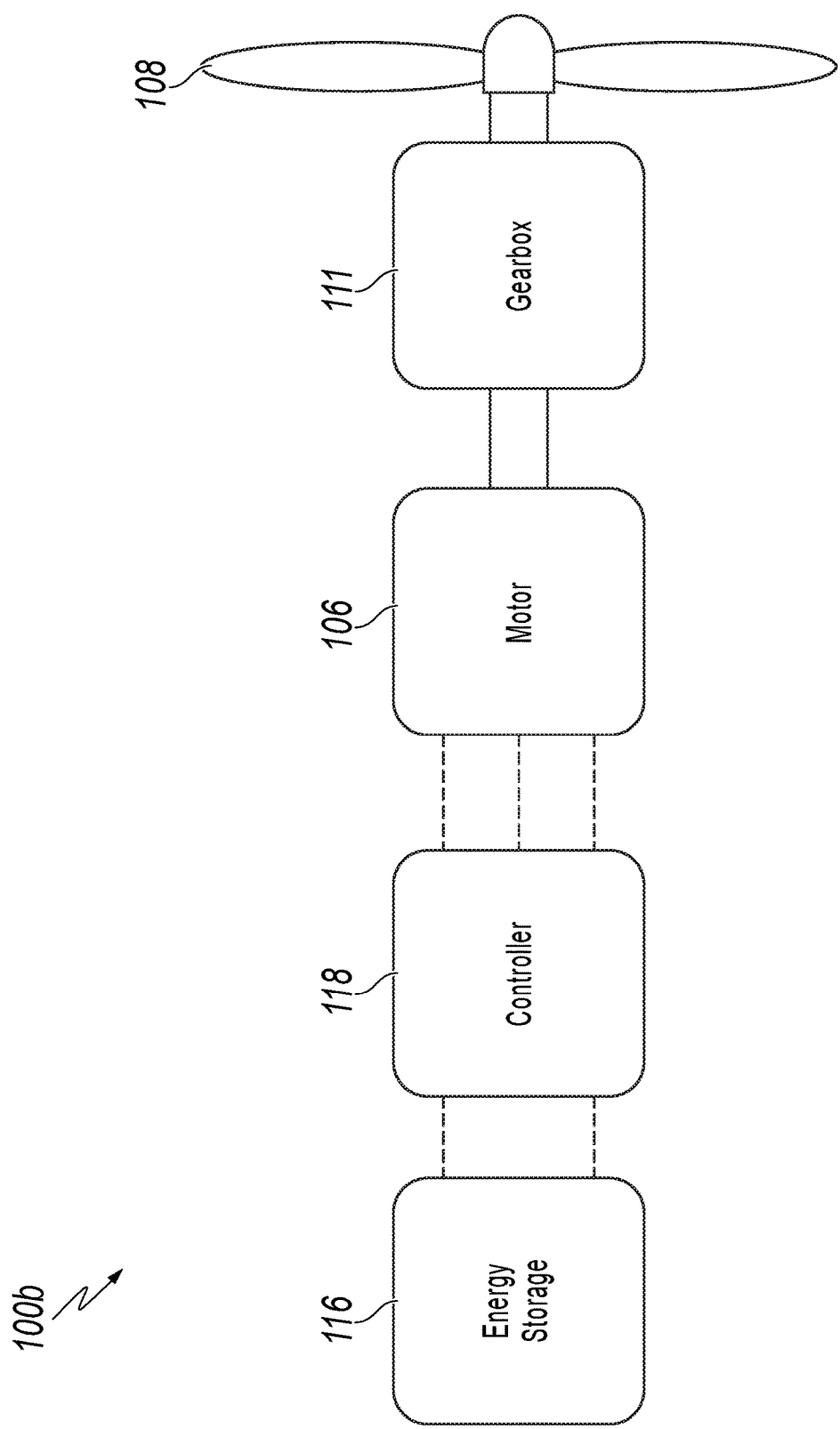
FIG. 1B is a block diagram of an example propulsion system that can be used with an aircraft explained in FIG. 1A.
Figure 2A:
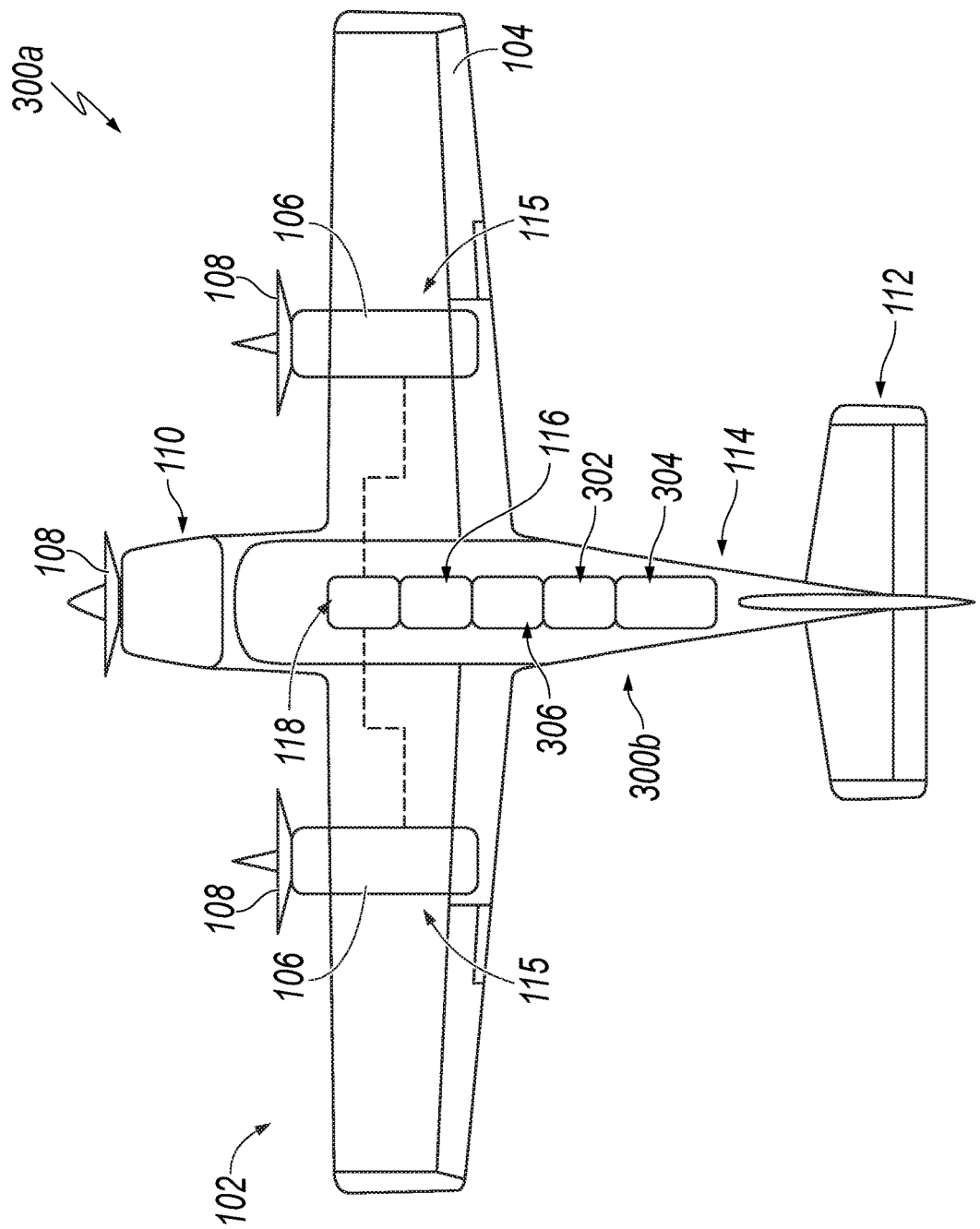
FIG. 2A is a top-down schematic diagram of an example aircraft.

In some implementations, energy storage 116 and a controller 118 are placed in the main body frame 114, fuselage 110, wings (102 and/or 104), or any other portion of the aircraft 100a. The energy storage 116 and controller 118 at least partially power the aircraft 100a. FIG. 1B is a block diagram of an example power plant 100b that can be used with an aircraft 100a and aircraft 300a (FIG. 2A). In the power plant 100b the energy storage 116 (e.g., battery, super capacitor, or other DC supply) supplies stored energy to the controller 118. The controller 118 then sends a drive current to the electric motor 106 which then releases the stored energy during operation to propel the aircraft 100a. In some implementations, a gearbox 111 can be included between the propeller 108 and the electric motor 106. The gearbox 111 can be used to increase or decrease a rotational speed of the propeller 108 relative to the rotational speed of the electric motor 106. In some implementations, the gearbox includes a fixed or a variable speed gearbox. In some implementation, the gearbox can include a pulley, chain, or fluid drive system.

FIG. 2A is a top-down schematic diagram of an example aircraft 300a that includes an internal combustion engine 304. The aircraft 300a includes similar features as those described in reference to FIGS. 1A-1B with any differences described herein. The aircraft 300a includes an internal combustion engine 304 and an electric generator 302.

Figure 2B:
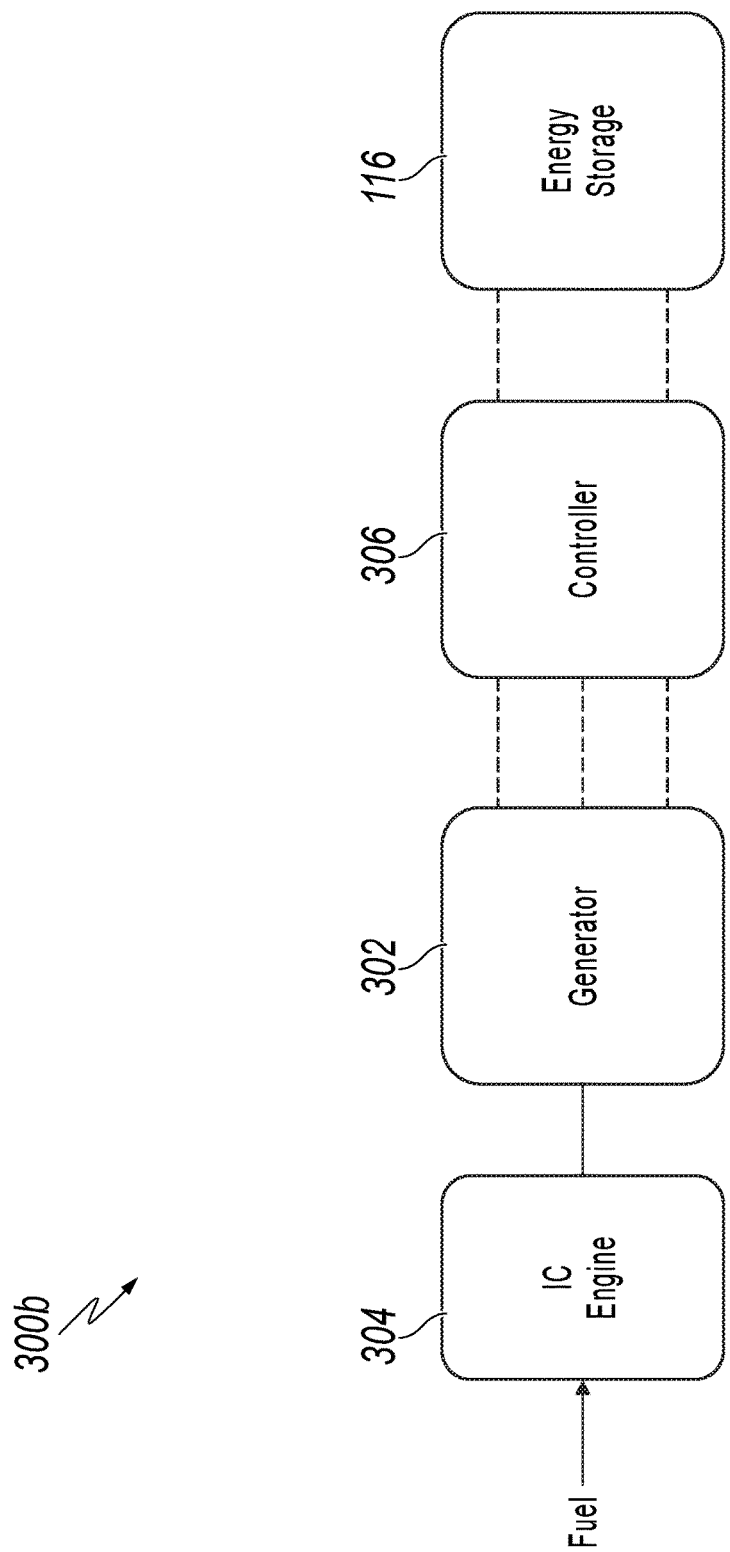
FIG. 2B is a block diagram of an example propulsion system that can be used with an aircraft explained in FIG. 1A.

FIG. 2B is a block diagram of an example power plant 300b that can be used with aircraft 300a. The electric generator 302 is driven by the internal combustion engine 304. The aircraft power plant 300b includes a generator controller 306 that is connected to an electric generator 302 and is configured to exchange electrical power between the electric generator 302 and the energy storage 116. While illustrated and described primarily as two separate controllers, in some implementations, the generator controller 306 and the controller 118 can be combined. The energy storage 116 is configured to store energy from the electric generator 302 and supply energy, for example, to the electric motor 106. Alternatively or in addition, a power distribution manifold can be included in the example power plants 300b and/or 100b. For example, a power distribution manifold can connect the generator controller 306, the energy storage 116, and the controller 118.

Figure 3:
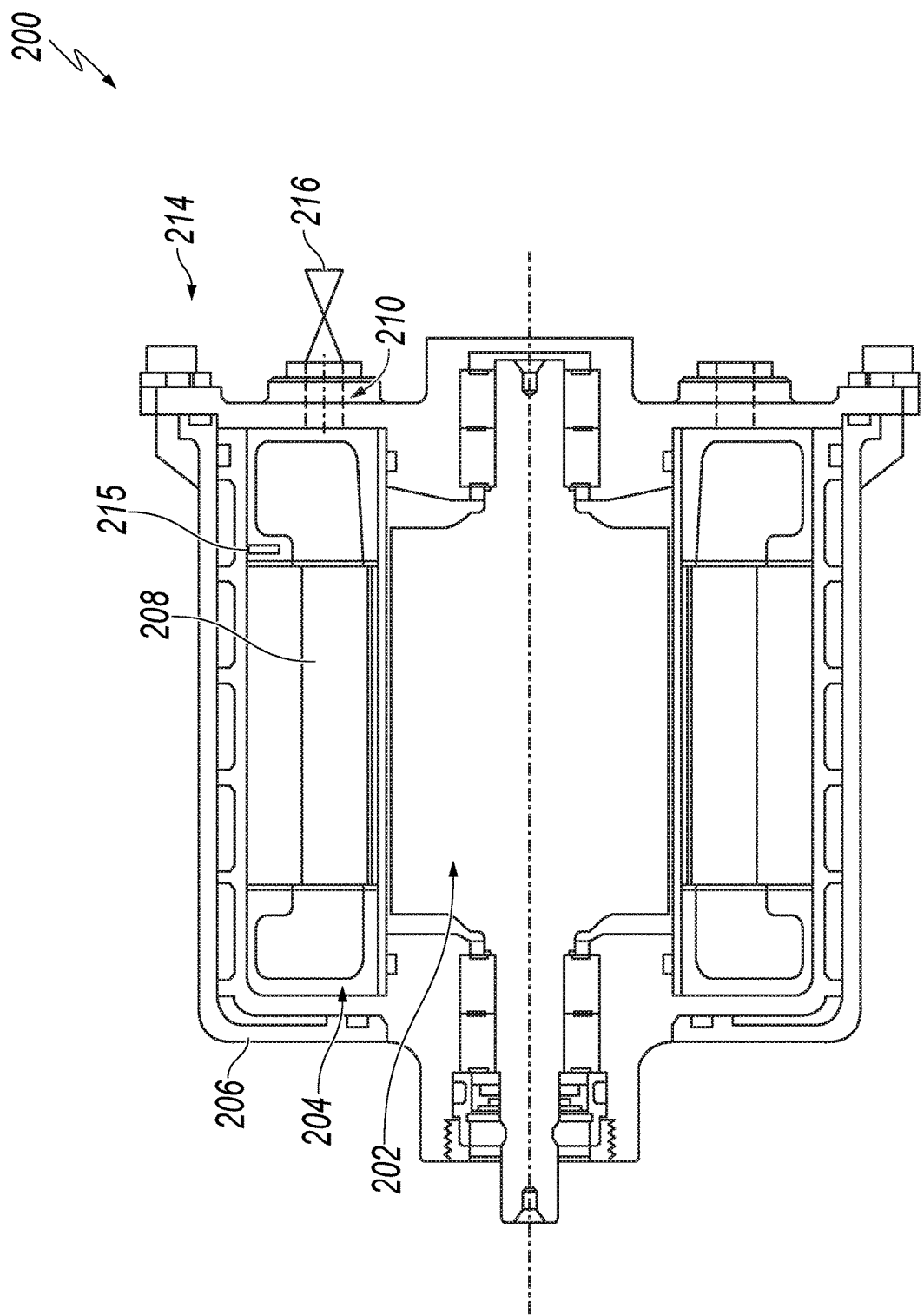
FIG. 3 is a side-cross sectional view of an example aircraft electric machine.

FIG. 3 is a side-cross sectional view of an example aircraft electric machine 200. The aircraft electric machine 200 can be the electric motor 106 as described in reference to FIGS. 1A-1B and/or as an electric generator 302 as described in FIGS. 2A-2B. In some examples, the aircraft electric machine 200 includes a rotor 202 (e.g., permanent magnet rotor, wound rotor, or squirrel cage induction rotor) which is a moving part of the aircraft electric machine 200 and interacts with an electrical stator 208 to generate mechanical or electrical power. The electrical stator 208 is a stationary part that surrounds and, in some implementations, supports the rotor 202. The electrical stator 208 includes windings within a chamber 204 defined by the housing 206, including the non-metallic bore seal 207. The aircraft electric machine 200 is operated at a varying altitudes which can result in various ambient pressures. The change in pressure due to the varying altitude during operation directly affects the dielectric strength of an air gap between the stator's windings and the housing or surrounding electrically conductive components. In some instances, such effects can result in lowering the breakdown voltage of the air gap, and eventual arcing between the stator windings and the housing 206. To reduce this risk, an absolute pressure of gas within the chamber 204 is enclosed and retained by the housing 206. For example, at high altitude, the pressure within the chamber 204, in some instances, is maintained at one atmosphere or greater absolute pressure. A pressure port 210 is defined by the housing 206 and is configured to exchange pressure between an interior (chamber 204) of and exterior 214 of the housing 206. The aircraft electric machine 200 also includes a valve 216 fluidically coupled to the pressure port 210 and configured to regulate the pressure exchange through the pressure port 210. The valve 216 can include a ball valve, a globe valve, a needle valve, or any other valve capable of maintaining pressure within the housing for a duration of a flight. In some instances, at ground level, the valve 216 is used to equalize the chamber 204 to ambient (ground) pressure after each flight. In some instances, the pressure port 210 is coupled to a compressor or a pump configured to increase the pressure within the chamber 204. In some implementations, the controller 118 described in reference to FIG. 1B is in direct communication with the aircraft electric machine 200 and actively regulates the pump or compressor fluidically connected to the chamber 204. In some examples, such a pump or compressor can be driven by the internal combustion engine 304 or the electric motor 106.

In implementations where multiple aircraft electric machines 200 are used (as generators and/or motors) on an aircraft, each chamber 204 within each aircraft electric machine 200 similarly maintains a pressure of substantially one atmosphere or greater when the aircraft carrying the electric machine is in flight at cruising altitudes, for example, 30,000 feet. A pressure sensor 215 is included within the chamber 204 to detect the pressure within the chamber 204. The pressure sensor 215 produces a pressure stream that is representative of a pressure within the chamber 204. The pressure stream can include a digital or analog stream that can be transmitted by electrical, pneumatic, or hydraulic signals. The pressure sensor 215 is in direct communication with a controller (118, 306, or both) that receives the pressure stream from the pressure sensor 215. In some implementations, in response to the pressure stream, the controller (118, 306, or both) can send a control signal to a compressor, pump, or valve 216 to adjust the pressure within one or more chambers across one or more electric machines for an optimal dielectric value. In some implementations, the dielectric strength of the stator's windings can be directly measured by a dielectric sensor. In such implementations, the controller can receive a dielectric stream from the dielectric sensor, in addition to or in lieu of the pressure stream from the pressure sensor 215, and can react similarly as it would to the pressure stream.

Figure 4A:
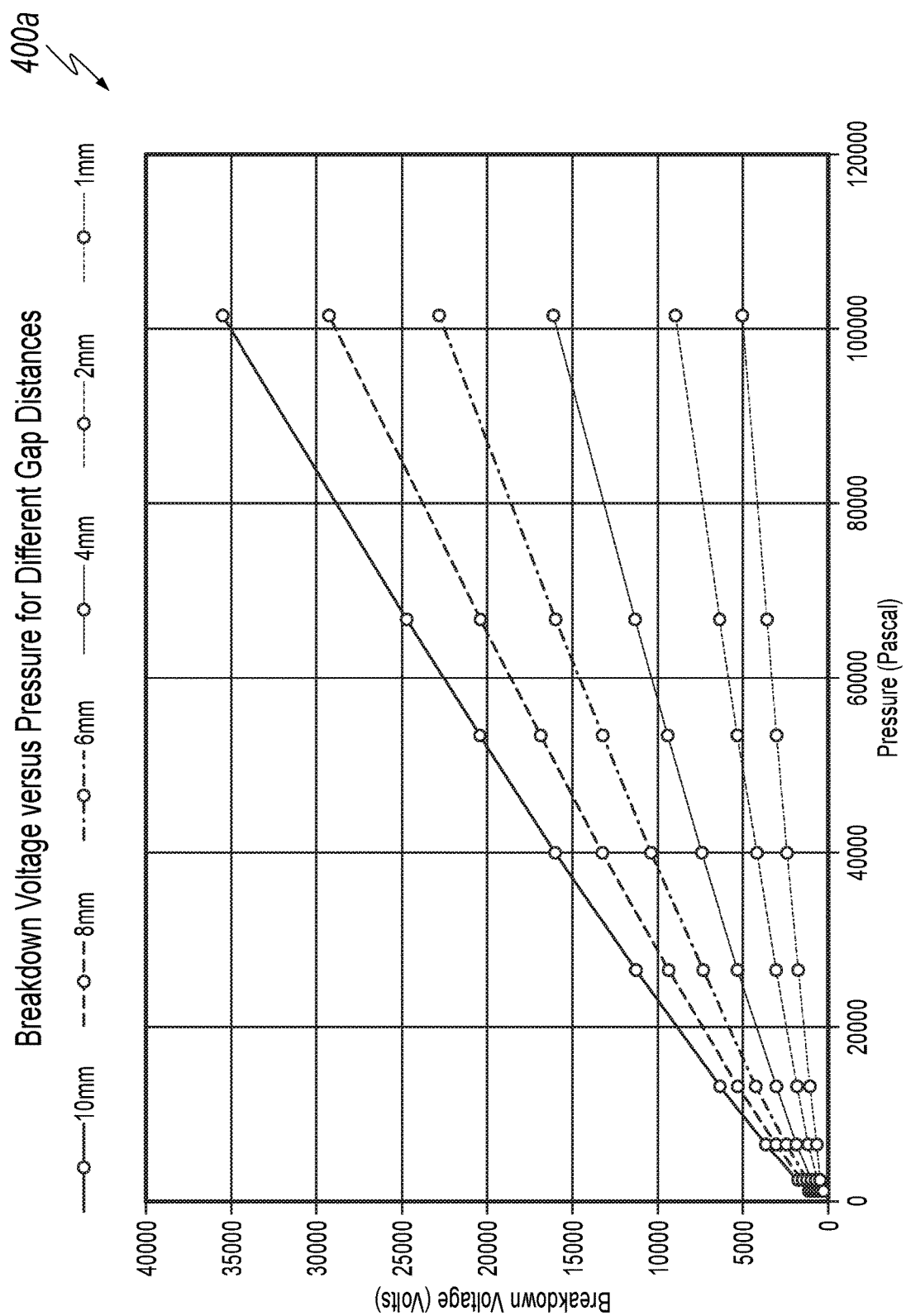
FIGS. 4A-4C are graphs illustrating the dielectric properties of air at various pressures and gap widths.
Figure 4B:
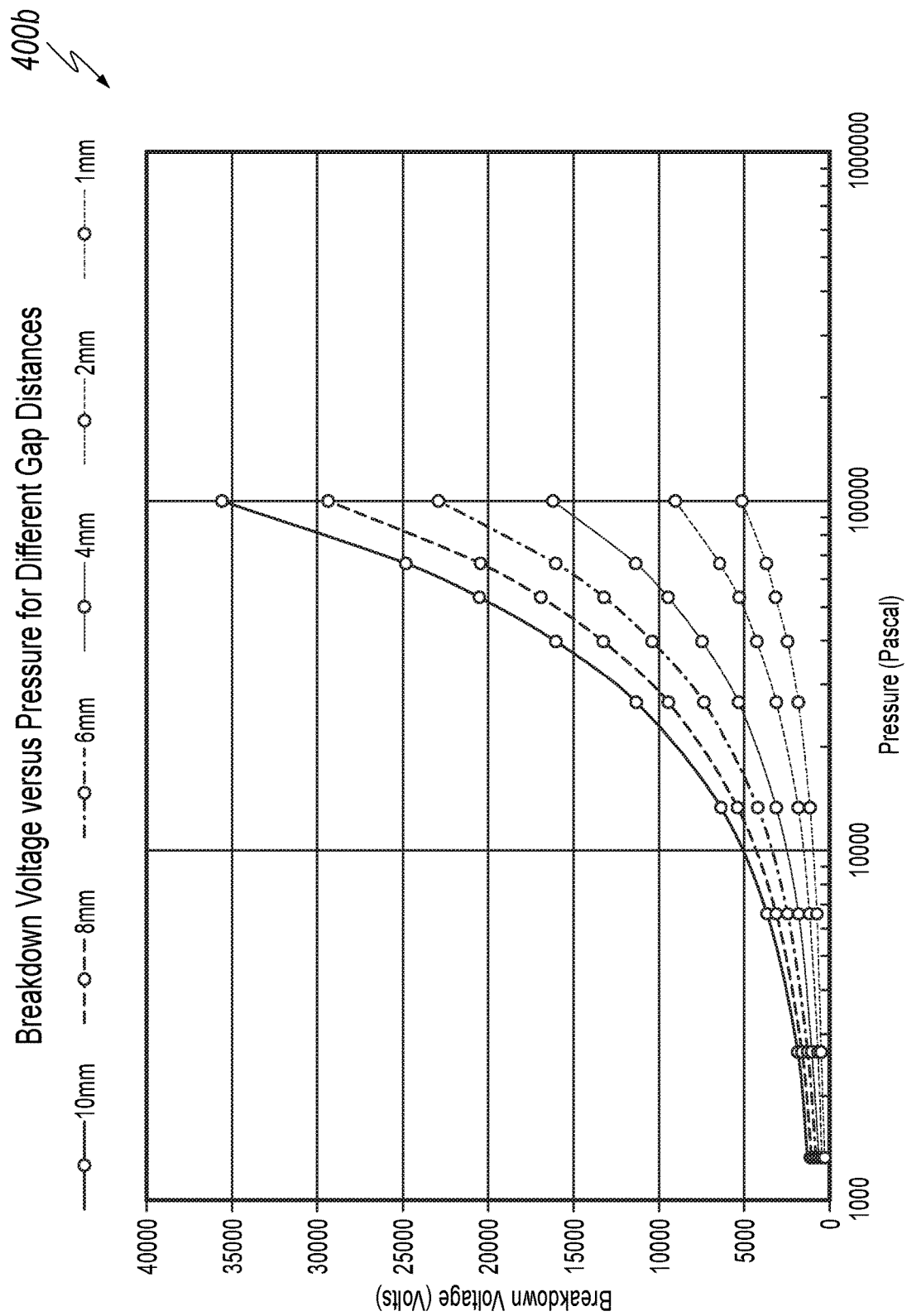
Figure 4C:
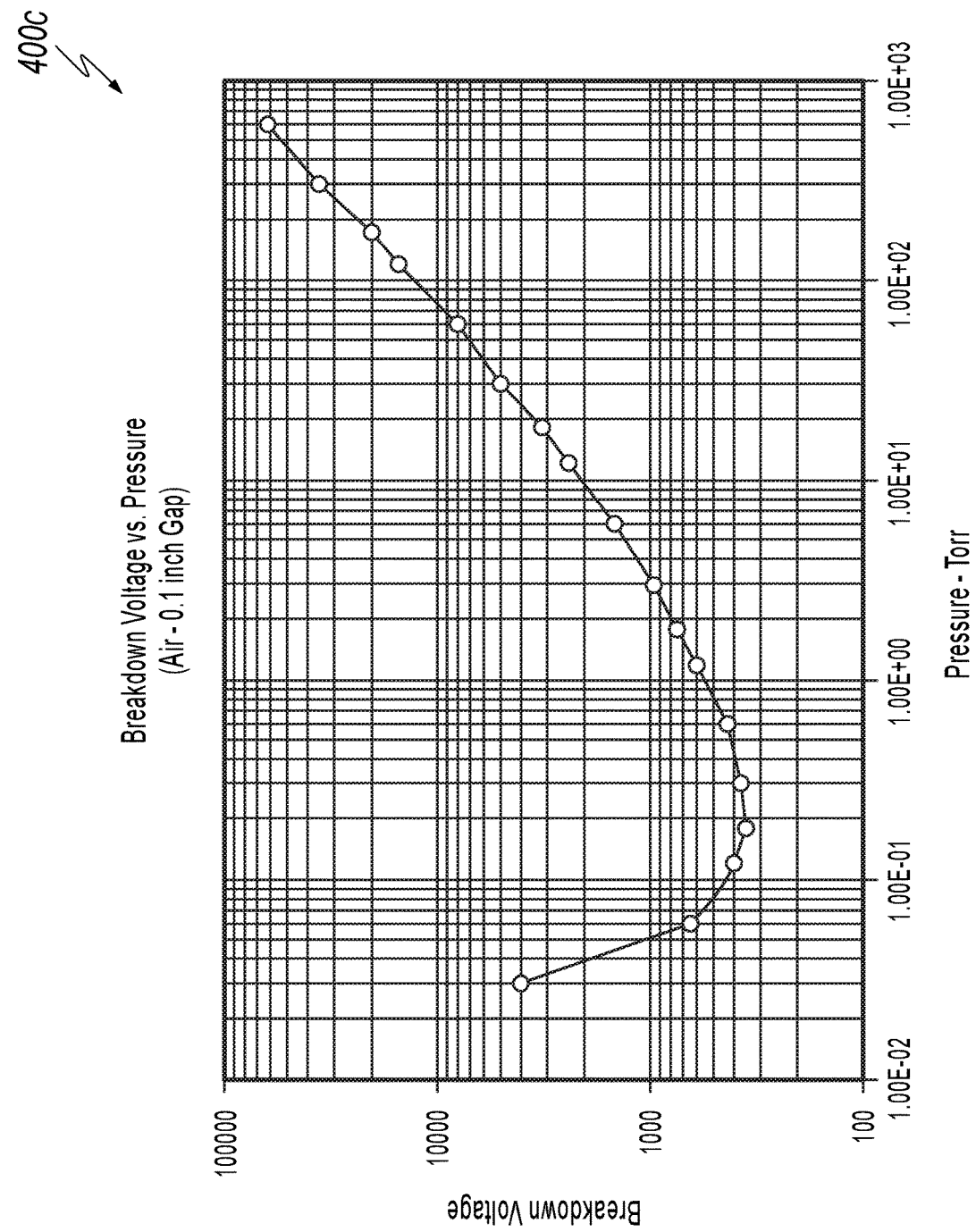

FIGS. 4A-4C are graphs 400a, 400b, and 400c illustrating the dielectric properties of air at various pressures and gap widths. FIG. 4A is displayed with a standard scale while FIG. 4B is displayed with a logarithmic scale. The graphs 400a, 400b show the relationship between a breakdown voltage and a pressure at various air-gaps measured in millimeters. The air-gap represents the distance between the electric stator's windings and surrounding electrically conductive components, such as the housing 206 or the stator's laminated steel core. As the air gap between the stator's windings and the electrically conductive components increases, the breakdown voltage is at its highest. As the air-gap decreases, the breakdown voltage also decreases. At the higher pressure, the dielectric property between the electrical stator 208 and the housing 206 improves. Similarly, once the internal pressure of the chamber decreases to be substantially vacuum, as seen in FIG. 4C, the dielectric property between the electrical stator 208 and the housing 206 similarly improves. For the purposes of this disclosure, "substantially vacuum" is taken to mean a low enough pressure to result in similar or better dielectric strength as is provided by substantially one atmosphere or absolute pressure. The aircraft electric machine described in reference to FIGS. 1-3 maintains desirable pressure within the chamber 204 at different operating altitudes and reduces the likelihood of failures as a result of arcing due to poor dielectric conditions.

Figure 5:
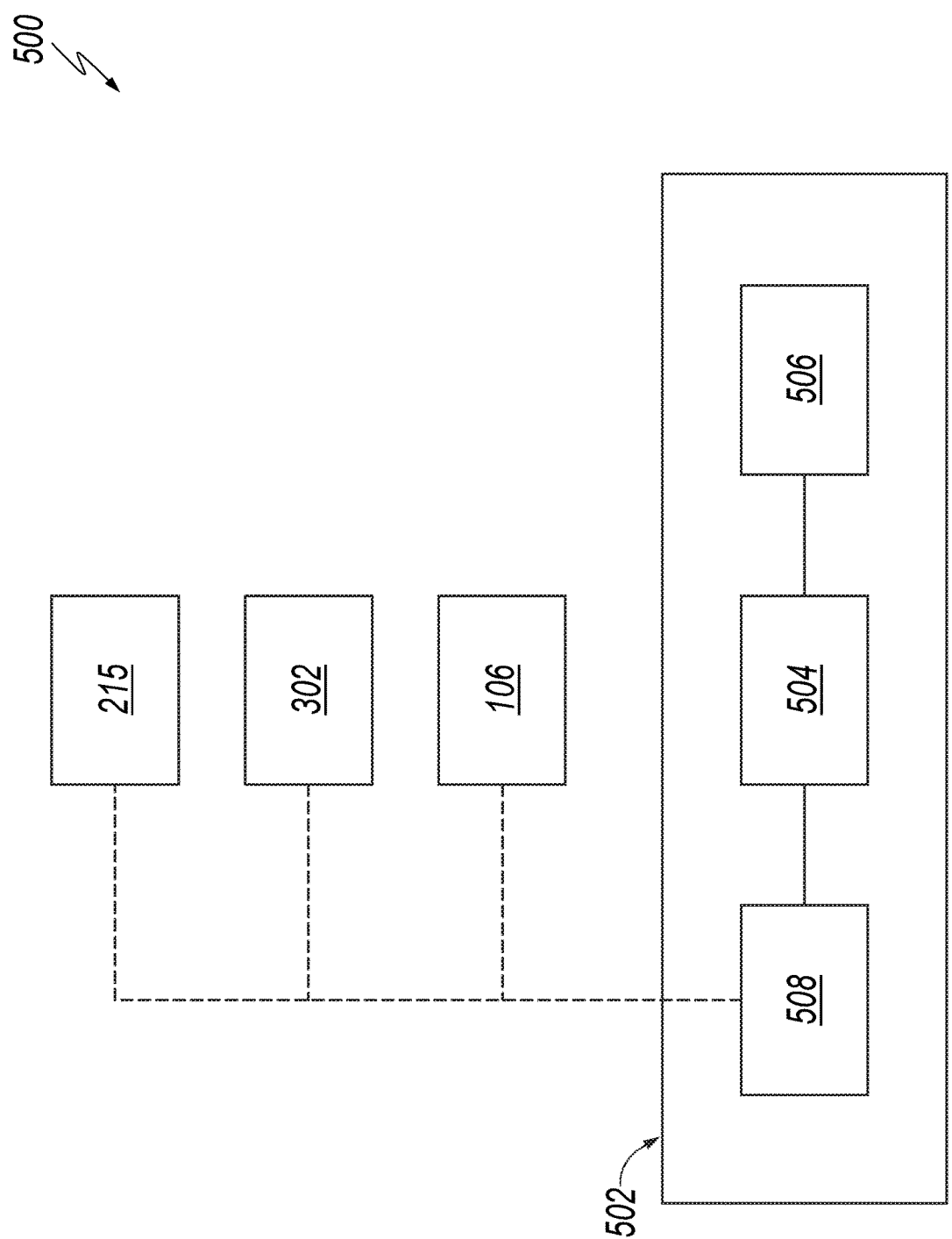
FIG. 5 is a schematic block diagram of a controller that can be used with aspects of this disclosure.

FIG. 5 is a block diagram 500 of an example controller 502 that can be used within the context of this disclosure. The controller 502 can be used as the controller 118, the controller 306, or both. The controller 502 can, among other things, monitor parameters of the system and send signals to actuate and/or adjust various operating parameters of the example power plants 100b, 300b. As shown in FIG. 5, the controller 502, in certain instances, includes a processor 504 (e.g., implemented as one processor or multiple processors) and a memory 506 (e.g., implemented as one memory or multiple memories) containing instructions that cause the processor 504 to perform operations described herein. The processor 504 is coupled to an input/output (I/O) interface 508 for sending and receiving communications with components in the aircraft (100a or 300a), including, for example, an electric motor 106 or an electric generator 302. In certain instances, the controller 502 can additionally communicate status with and send actuation and/or control signals to one or more of the various system components (for example, a pump or compressor to pressurize the chamber 204, or an electric motor 106 or an electric generator 302) of the aircraft (100a or 300a), as well as with the pressure sensor 215, dielectric sensors, and other types of sensors. In certain instances, the controller 502 can communicate status and send actuation and control signals to one or more of the components within the aircraft (100a or 300a) or external to the aircraft (100a or 300a), such as the compressor or the control pump. The communications can be hard-wired, wireless, or a combination of wired and wireless. In some implementations, the controller 502 can be a distributed controller with different portions located about the aircraft. For example, in certain instances, the controller 502 can be located within the fuselage 110, or it can be located within one or both of the wings (102 and/or 104). Additional controllers can be used throughout the aircraft as stand-alone controllers or networked controllers without departing from this disclosure. The controller 502 can operate in monitoring, commanding, and maintaining pressure in the chambers 204 of the aircraft (100a or 300a). In some implementations, to monitor the pressure and/or dielectric, the controller 502 is used in conjunction with a sensor, such as pressure sensor 215. Input and output signals, including the data from the sensor, is controlled and monitored by the controller 502, and can be logged continuously by controller 502.

In operation, the aircraft electric machine 200 maintains a pressure at a first altitude within a sealed chamber 204 that encloses the electrical stator 208. The chamber is defined by the housing 206, which includes the non-metallic bore seal 207. The aircraft electric machine 200 maintains the pressure within the sealed chamber 204 at a second altitude. In some instances, the second altitude is different from the first altitude. For example, the first altitude may be at ground level while the second altitude may be at a designated cruising flight altitude. In implementations with a generator, such as electric generator 302, the electric generator 302 can be driven by the internal combustion engine 304. In implementations that include an electric motor, such as electric motor 106, a propeller 108 can be driven directly (for example, directly coupled by a single shaft) or indirectly (for example, through the gearbox 111) by the electric motor 106. Pressure is received by the chamber 204 through the pressure port 210 in the housing 206. The pressure port 210 is sealed by a valve 216 fluidically connected to the pressure port 210. The pressure is maintained within the chamber 204 at the first altitude and the second altitude. In some implementations, the pressure within the chamber 204 is maintained to be greater than a pressure outside the housing 206 when the aircraft electric machine 200 is at the second altitude, that is, when the aircraft carrying the aircraft electric machine 200 is in flight. In some implementations, the pressure within the chamber 204 is maintained to be substantially a vacuum. The system maintains a breakdown voltage above a desired threshold by maintaining pressure within the chamber 204. In some implementations, the pressure within the chamber 204 can be dynamically controlled. In such implementations, a controller, such as controller 306 or 118, receives a pressure stream from a pressure sensor 215 within the chamber 204. Responsive to the received pressure stream, the controller 306 or 118 can then adjust the pressure within the chamber 204 to achieve the desired dielectric property by sending a control signal to a pump, compressor, or the valve 216.

While this disclosure contains many specific implementation details, these should not be construed as limitations on the scope of what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the previously described implementations should not be understood as requiring such separation or integration in all implementations, and it should be understood that the described components and systems can generally be integrated together in a single product or packaged into multiple products.

Accordingly, the previously described example implementations do not define or constrain the present disclosure. Other changes, substitutions, and alterations are also possible without departing from the spirit and scope of the present disclosure.

A number of implementations of these systems and methods have been described. Nevertheless, it will be understood that various modifications may be made without departing from the spirit and scope of this disclosure. Accordingly, other implementations are within the scope of the following claims.

What is claimed is:

1. An aircraft electric machine comprising:
    a rotor;
    an electric stator surrounding and supporting the rotor; and
    a housing defining a sealed chamber enclosing the electric stator and configured to maintain an absolute pressure of a gas within the chamber as an aircraft with the aircraft electric machine changes altitude.

2. The aircraft electric machine of claim 1, wherein the housing comprises a bore seal between the stator and the rotor, the bore seal comprising a non-metallic material, the bore seal defining a portion of the sealed chamber.

3. The aircraft electric machine of claim 1, wherein the housing comprises:
    a pressure port configured to exchange pressure between an interior of and exterior of the chamber; and
    a valve fluidically coupled to the pressure port, the valve configured to regulate pressure exchange through the pressure port.

4. The aircraft electric machine of claim 3, further comprising a pump or compressor coupled to the pressure port.

5. The aircraft electric machine of claim 4, further comprising a controller configured to control the pump or compressor responsive to a pressure within the chamber.

6. The aircraft electric machine of claim 1, wherein the rotor comprises a permanent magnet rotor.

7. The aircraft electric machine of claim 1, wherein the aircraft electric machine is coupled to a propeller or fan such that the aircraft electric machine drives the propeller or fan.

8. The aircraft electric machine of claim 1, wherein the aircraft electric machine is coupled to an internal combustion engine such that the aircraft electric machine is driven by the internal combustion engine.

9. A method comprising:
    maintaining a pressure at a first altitude within a sealed chamber, enclosing an electric stator, defined by a housing of an aircraft electric machine; and
    maintaining the pressure at a second altitude, within the sealed chamber, the second altitude being different from the first altitude.

10. The method of claim 9, further comprising driving the electric machine by an internal combustion engine.

11. The method of claim 9, further comprising driving a propeller or fan by the electric machine.

12. The method of claim 9, further comprising:
    receiving the pressure by the chamber through a port in the housing; and
    sealing the port by a valve fluidically connected to the port.

13. The method of claim 9, wherein maintaining the pressure within the chamber at the first altitude and the second altitude comprises maintaining the pressure within the chamber to be greater than a pressure outside the housing when the electric machine is at altitude.

14. The method of claim 13, wherein the pressure within the chamber is substantially one atmosphere absolute pressure or greater.

15. The method of claim 9, wherein the pressure within the chamber is substantially a vacuum.

16. The method of claim 9, further comprising maintaining a breakdown voltage above a desired threshold by the maintained pressure within the chamber.

17. The method of claim 9, further comprising:
receiving a pressure stream from a pressure sensor within the chamber; and
responsive to the pressure stream, adjusting the pressure within the chamber to achieve a desired dielectric property.

18. An aircraft propulsion system comprising:
an electric generator comprising:
  a rotor;
  an electric stator surrounding and supporting the rotor; and
  a housing defining a sealed chamber enclosing the electric stator, the housing comprising a bore seal between the stator and the rotor, the bore seal comprising a non-metallic material, the bore seal defining a portion of the sealed chamber, the housing configured to maintain an absolute pressure of a gas within the chamber as an aircraft with the electric generator changes altitude.

19. The aircraft propulsion system of claim 18, further comprising an internal combustion engine coupled to and configured to drive the electric generator.

20. The aircraft propulsion system of claim 18, wherein the rotor is a first rotor, the electric stator is a first electric stator, the housing is a first housing, and the sealed chamber is a first sealed chamber, the aircraft propulsion system further comprising:
an electric motor comprising:
  a second rotor;
  a second electric stator surrounding and supporting the second rotor; and
  a second housing defining a second sealed chamber enclosing the second electric stator and configured to maintain an absolute pressure of a gas within the second sealed chamber as an aircraft with the electric motor changes altitude; and
a propeller or fan rotably coupled to the electric motor, the propeller or fan configured to be driven by the electric motor.

21. The aircraft propulsion system of claim 20, wherein the first rotor or the second rotor comprises a permanent magnet rotor.

22. The aircraft propulsion system of claim 20, wherein a pressure within the first sealed chamber or the second sealed chamber is substantially one atmosphere or greater.

23. The aircraft propulsion system of claim 20, wherein a pressure within the first sealed chamber or the second sealed chamber is substantially a vacuum.

24. The aircraft propulsion system of claim 20 further comprising a controller coupled to the electric motor and the electric generator, the controller configured to:
exchange electrical current between the electric generator and the electric motor.

25. The aircraft propulsion system of claim 24, wherein the controller is further configured to:
receive a pressure stream or a dielectric stream from a sensor within the first sealed chamber or the second sealed chamber; and
responsive to the pressure stream or the dielectric stream, send a control signal to a compressor to adjust the pressure within the first sealed chamber or the second sealed chamber to achieve a desired dielectric value.

26. The aircraft propulsion system of claim 20, further comprising a battery or super capacitor electrically coupled to the electric generator and the electric motor, the battery or super capacitor configured to store charge from the electric generator and supply charge to the electric motor.

27. The aircraft propulsion system of claim 20, further comprising a gearbox coupled to the electric motor and the propeller or fan, the gearbox configured to be driven by the electric motor and drive the propeller or fan.

28. The aircraft propulsion system of claim 20, wherein the electric motor or the electric generator comprise a pressure port.

* * * * *